(12) United States Patent
Wang et al.

(10) Patent No.: US 11,693,293 B2
(45) Date of Patent: Jul. 4, 2023

(54) OPTICAL SYSTEM

(71) Applicant: TDK TAIWAN CORP., Taoyuan (TW)

(72) Inventors: Chao-Hsi Wang, Taoyuan (TW);
Chao-Chang Hu, Taoyuan (TW);
Che-Wei Chang, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 71 days.

(21) Appl. No.: 17/501,245

(22) Filed: Oct. 14, 2021

(65) Prior Publication Data

US 2022/0121086 A1   Apr. 21, 2022

Related U.S. Application Data

(60) Provisional application No. 63/092,342, filed on Oct. 15, 2020.

(51) Int. Cl.
*H04N 23/55* (2023.01)
*H04N 23/57* (2023.01)
*H04N 23/45* (2023.01)
*G03B 5/02* (2021.01)
(Continued)

(52) U.S. Cl.
CPC ............... *G03B 5/02* (2013.01); *G02B 7/005* (2013.01); *G02B 7/04* (2013.01); *H04N 23/45* (2023.01); *H04N 23/55* (2023.01); *H04N 23/57* (2023.01)

(58) Field of Classification Search
CPC .. H04N 5/2254; H04N 5/2257; H04N 5/2258; H04N 5/247; H04N 23/45; H04N 23/55; H04N 23/57; H04N 23/90; G03B 9/36–44; G03B 11/00–06; G06F 21/70–88
See application file for complete search history.

(56) References Cited

U.S. PATENT DOCUMENTS

2012/0086784 A1*  4/2012  Oh .................... H04N 23/50
                                                  156/182
2013/0033581 A1*  2/2013  Woo .................... G06F 1/1626
                                                  348/47

(Continued)

FOREIGN PATENT DOCUMENTS

CN       211698337 U  * 10/2020  ........... G01L 1/2287
EP        3062504 A1  *  8/2016  ........... H04N 5/2251
KR      20070052428 A  *  5/2007  ............. H04N 23/55

*Primary Examiner* — Paul M Berardesca
(74) *Attorney, Agent, or Firm* — Muncy, Geissler, Olds & Lowe, P.C.

(57) ABSTRACT

The present disclosure provides an optical system, including a first optical mechanism. The first optical mechanism includes a first movable part, a fixed assembly, a first driving assembly and a guiding assembly. The first movable part includes an optical element. The first movable part is movable relative to the fixed assembly. The first driving assembly is configured to drive the first movable part to move relative to the fixed assembly. The guiding assembly is configured to guide the first movable part to move relative to the fixed assembly. A friction force is generated between the first movable part and the guiding assembly, and the first movable part is temporarily positioned on the fixed assembly through the friction force.

17 Claims, 16 Drawing Sheets

(51) Int. Cl.
  *G02B 7/00*   (2021.01)
  *G02B 7/04*   (2021.01)

(56) References Cited

U.S. PATENT DOCUMENTS

| | | | |
|---|---|---|---|
| 2013/0222674 A1* | 8/2013 | Chen | H04N 23/67 |
| | | | 348/E5.055 |
| 2015/0288882 A1* | 10/2015 | Haddad | H04N 23/73 |
| | | | 348/211.2 |
| 2018/0059510 A1* | 3/2018 | Gustaveson, II | G03B 11/04 |
| 2018/0275368 A1* | 9/2018 | Lee | H04N 23/90 |
| 2018/0376123 A1* | 12/2018 | Rendlen | H04N 23/51 |
| 2019/0041904 A1* | 2/2019 | Fletcher | H04N 23/57 |
| 2020/0412920 A1* | 12/2020 | Yao | H04M 1/0264 |
| 2021/0067761 A1* | 3/2021 | Chen | G06T 7/571 |
| 2021/0149272 A1* | 5/2021 | Li | H04N 23/55 |
| 2022/0021791 A1* | 1/2022 | Imai | H04N 23/57 |

\* cited by examiner

OPTICAL SYSTEM

CROSS REFERENCE TO RELATED APPLICATIONS

This application claims the benefit of U.S. Provisional Application No. 63/092,342, filed on Oct. 15, 2020, the entirety of which is incorporated by reference herein.

BACKGROUND OF THE DISCLOSURE

Field of the Disclosure

The present disclosure relates to an optical system, and in particular it relates to an optical system with a shutter structure.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens and a shutter mechanism. However, although the existing driving mechanism can achieve the aforementioned functions of photographing or video recording, they still cannot meet all the needs of the users.

Therefore, how to design a camera module capable of capturing images and capable of achieving miniaturization are topics nowadays that need to be discussed and solved.

BRIEF SUMMARY OF THE DISCLOSURE

According to some embodiments of the disclosure, the present disclosure provides an optical system, including a first optical mechanism, and the first optical mechanism includes a first movable part, a fixed assembly, a first driving assembly and a guiding assembly. The first movable part includes an optical element. The first movable part is movable relative to the fixed assembly. The first driving assembly is configured to drive the first movable part to move relative to the fixed assembly. The guiding assembly is configured to guide the first movable part to move relative to the fixed assembly. A friction force is generated between the first movable part and the guiding assembly, and the first movable part is temporarily positioned on the fixed assembly through the friction force.

According to some embodiments, the fixed assembly includes: a first opening, configured to allow a first light beam to pass through to enter a second optical mechanism; and a second opening, configured to allow a second light beam to pass through to enter a third optical mechanism. The first light beam is parallel to the second light beam. The second optical mechanism includes a camera module configured to capture an image. The third optical mechanism includes a depth-sensing module configured to measure distance. When viewed along the first axis, the first opening and the second opening are arranged along the second axis. The first axis is parallel to the first light beam. The second axis is perpendicular to the first axis.

According to some embodiments, when viewed along the first axis, the first driving assembly and the first opening are arranged along the second axis. When viewed along the second axis, the first opening overlaps at least a part of the second opening. When viewed along the first axis, the fixed assembly has a long strip-shaped structure extending along the second axis. When viewed along the first axis, the first opening is located on a first end portion of the fixed assembly.

According to some embodiments, the first optical mechanism further includes a supporting assembly configured to affix the fixed assembly to a base body of the optical system. When viewed along the first axis, the first opening is located between the supporting assembly and the first driving assembly. The supporting assembly and the fixed assembly form a first accommodation space. At least a part of the second optical mechanism is located in the first accommodation space. The supporting assembly includes a first supporting element, and the first supporting element has a columnar structure, a flat plate-shaped structure, or a u-shaped plate structure. The first supporting element includes a shock-absorbing material.

According to some embodiments, the first driving assembly includes: a coil; a first magnetic element, corresponding to the coil, and a magnetically conductive element, corresponding to the coil and having a magnetically conductive material. The coil surrounds the magnetically conductive element. The magnetically conductive element has a plate-shaped structure and is perpendicular to a third axis. The third axis is perpendicular to the first axis and the second axis. When viewed along the first axis, the magnetically conductive element with a long strip-shaped structure extends along the second axis.

According to some embodiments, the guiding assembly has a first groove configured to accommodate the first magnetic element. The first groove extends along the second axis. When viewed along the first axis, the fixed assembly having a polygonal structure includes a first side and a second side that are parallel to each other. When viewed along the first axis, the shortest distance between the first groove and the first side is different from the shortest distance between the first groove and the second side. When viewed along the first axis, the first groove does not overlap the magnetically conductive element. When viewed along the first axis, the first groove does not overlap the center of the coil.

According to some embodiments, the first movable part further includes a first holder configured to hold the first magnetic element. The first holder has a first upper cover. The width of the first upper cover in the third axis is greater than the width of the first groove in the third axis. The first upper cover is configured to contact the upper surface of the fixed assembly.

According to some embodiments, when the first movable part is located at a first preset position relative to the fixed assembly, and when viewed along the first axis, the first optical element overlaps the first opening. When the first movable part is located at the first preset position, and when viewed along the first axis, the first optical element and the second opening do not overlap. When the first movable part is located at a second preset position relative to the fixed assembly, and when viewed along the first axis, the first optical element overlaps the second opening. When the first movable part is located at the second preset position, and when viewed along the first axis, the first optical element does not overlap the first opening.

According to some embodiments, when viewed along the first axis, the first driving assembly is located between the first opening and the second opening. The guiding assembly includes a first track formed on the fixed assembly. The first movable part is configured to move along the first track.

According to some embodiments, the guiding assembly further includes a second track formed on the fixed assembly or the base body. The first movable part is configured to move along the second track. When viewed along the second axis, the first track and the second track are located on opposite sides of the first movable part.

According to some embodiments, when viewed along the first axis, the first opening is located between the second opening and the first driving assembly. The second optical mechanism and the third optical mechanism are disposed on the base body and located on the same plane. The second optical mechanism has a second camera lens corresponding to the first opening. The third optical mechanism has a third camera lens corresponding to the second opening. The size of the first opening is the same as the size of the second opening. The aperture of the second camera lens is different from the aperture of the third camera lens.

According to some embodiments, the aperture of the second camera lens is larger than the aperture of the third camera lens. The distance between the second camera lens and the first opening in the first axis is shorter than the distance between the third camera lens and the second opening in the first axis.

According to some embodiments, when the first movable part is located at a first preset position relative to the fixed assembly, and when viewed along the first axis, the first optical element overlaps the first opening. When the first movable part is located at the first preset position, and when viewed along the first axis, the first optical element overlaps the second opening.

According to some embodiments, when the first movable part is located at a second preset position relative to the fixed assembly, and when viewed along the first axis, the first optical element does not overlap the first opening. When the first movable part is located at the second preset position, and when viewed along the first axis, the first optical element does not overlap the second opening.

According to some embodiments, when viewed along the first axis, the first driving assembly is located between the first opening and the second opening. The first optical mechanism further includes a second movable part configured to move along the second axis relative to the fixed assembly. The second movable part includes a second optical element. The first driving assembly further includes a second magnetic element corresponding to the coil. The second movable part further includes a second holder configured to hold the second magnetic element.

According to some embodiments, the second holder has a second upper cover. The second upper cover is configured to contact the upper surface. The guiding assembly further has a second groove configured to accommodate the second magnetic element. The second groove extends along the second axis. The width of the second upper cover in the third axis is greater than the width of the second groove in the third axis. When viewed along the second axis, the coil is located between the first magnetic element and the second magnetic element. When the coil is provided with electricity, the first magnetic element and the second magnetic element respectively induce a first electromagnetic driving force and a second electromagnetic driving force with the coil. The first electromagnetic driving force and the second electromagnetic driving force respectively drive the first movable part and the second movable part to move in a first direction and a second direction at the same time. The first direction is opposite the second direction.

According to some embodiments, the fixed assembly further includes a separating element extending along the first axis from the upper surface. When viewed along the first axis, the separating element is located between the first groove and the second groove. A first magnetic attraction force is generated between the first magnetic element and the magnetically conductive element. When viewed along the second axis, the first magnetic attraction force drives the first upper cover to contact the separating element. A second magnetic attraction force is generated between the second magnetic element and the magnetically conductive element. When viewed along the second axis, the second magnetic attraction force drives the second upper cover to contact the separating element.

According to some embodiments, the guiding assembly further includes a first lateral sliding track formed on the fixed assembly. The first lateral sliding track is configured to guide the first optical element. The guiding assembly further includes a second lateral sliding track formed on the fixed assembly. The second lateral sliding track is configured to guide the second optical element. When the first movable part and the second movable part are located at the second preset position relative to the fixed assembly, and when viewed along the second axis, the shortest distance between the first optical element and the upper surface is different from the shortest distance between the second optical element and the upper surface.

According to some embodiments, the shortest distance between the first optical element and the upper surface is greater than the shortest distance between the second optical element and the upper surface. When the first movable part and the second movable part are located at the second preset position relative to the fixed assembly, and when viewed along the first axis, the first optical element overlaps at least a part of the second optical element.

According to some embodiments, when viewed along the first axis, the first opening is located between the second opening and the first driving assembly. The first optical element has a penetrating portion. The penetrating portion has a rectangular structure. When the first movable part is located at the second preset position relative to the fixed assembly, and when viewed along the first axis, the penetrating portion is located between the first opening and the second opening. The supporting assembly includes a second supporting element, and the second supporting element is located between the second optical mechanism and the third optical mechanism.

The present disclosure provides an optical system including a first optical mechanism, a second optical mechanism and a third optical mechanism. The base of the first optical mechanism has a first opening and a second opening respectively corresponding to the second optical mechanism and the third optical mechanism. In some embodiments, the first driving assembly of the first optical mechanism can drive the first movable part to move to selectively shade the first opening or the second opening individually, or shade the first opening and the second opening at the time.

In some embodiments, the first driving assembly of the first optical mechanism may include two magnetic elements and a corresponding coil to respectively drive the first movable part and the second movable part to move to shade or open the first opening and second opening al the same time. The several embodiments of the present disclosure can be applied to different electronic devices according to actual needs.

Based on the above-mentioned structural configuration, the optical system can be miniaturized, and the number of components and the production cost can be reduced.

DETAILED DESCRIPTION OF THE ILLUSTRATIVE EMBODIMENTS

Figure 1:
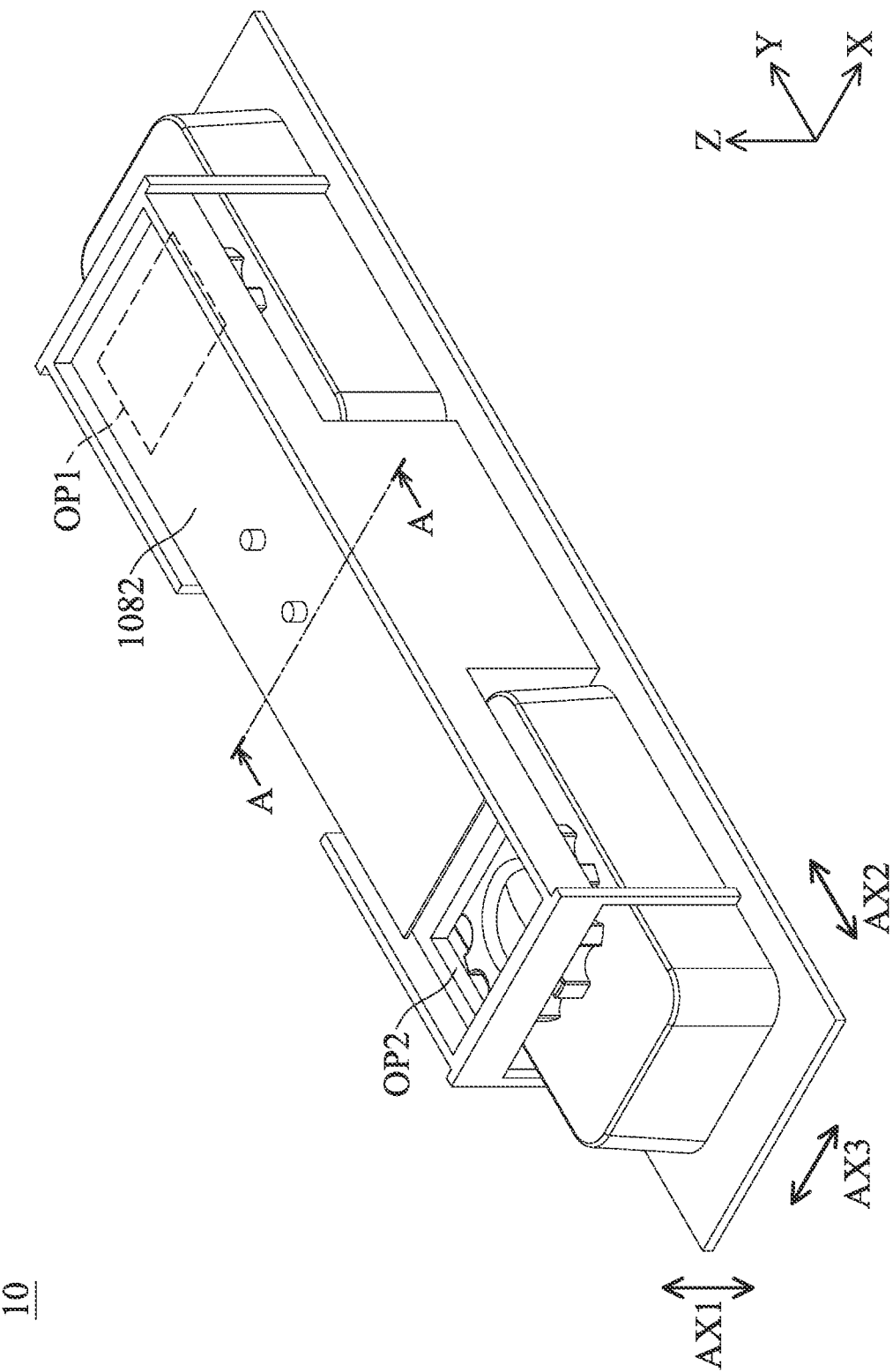
FIG. 1 is a perspective view of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
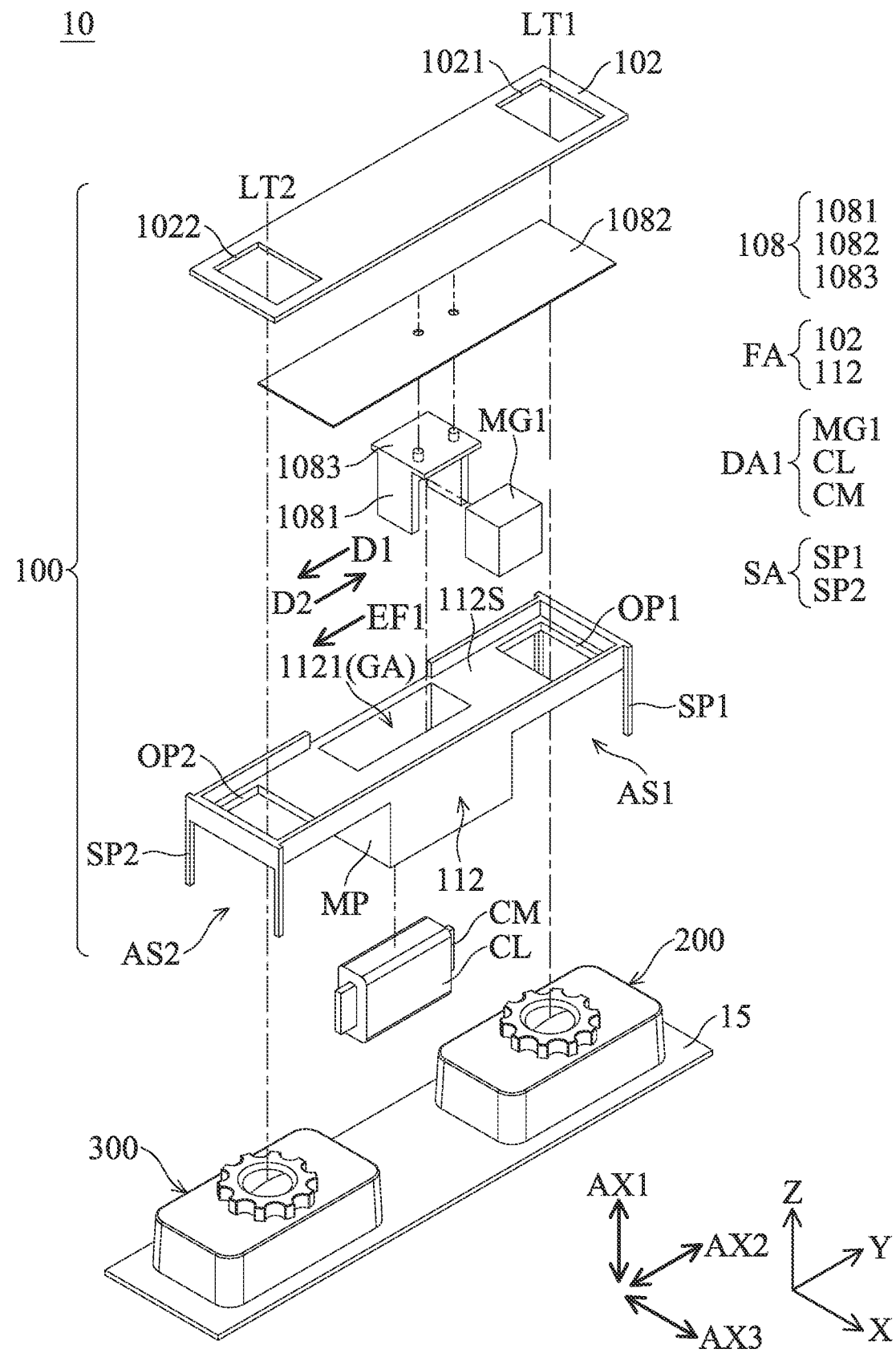
FIG. 2 is an exploded diagram of the optical system 10 according to an embodiment of the present disclosure.
Figure 3:
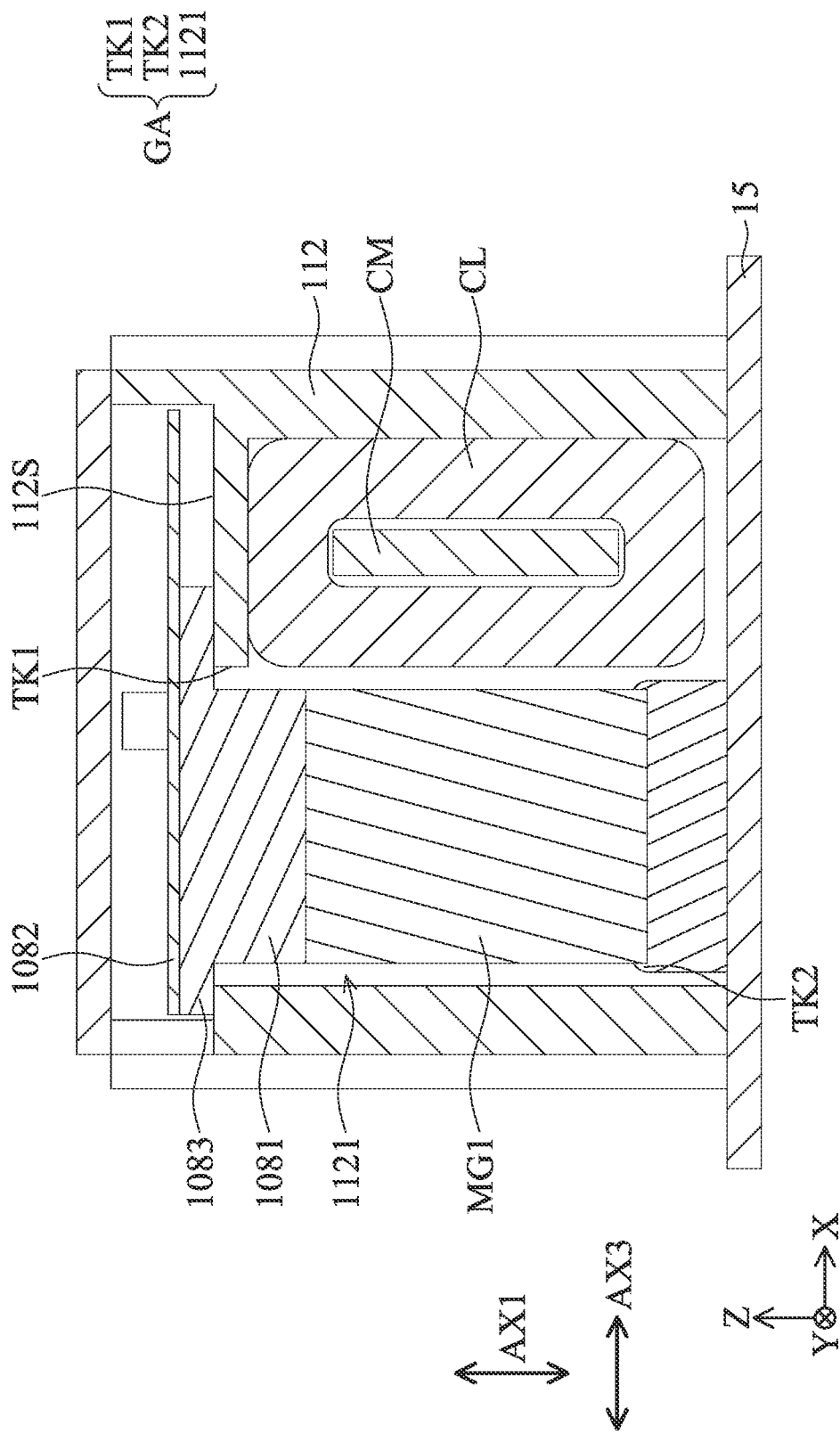
FIG. 3 is a cross-sectional view of the optical system 10 along the line A-A in FIG. 1 according to an embodiment of the present disclosure.

Please refer to FIG. 1 to FIG. 3. FIG. 1 is a perspective view of an optical system 10 according to an embodiment of the present disclosure, FIG. 2 is an exploded diagram of the optical system 10 according to an embodiment of the present disclosure, and FIG. 3 is a cross-sectional view of the optical system 10 along the line A-A in FIG. 1 according to an embodiment of the present disclosure. The optical system 10 may be an optical camera module configured to hold and drive at least one optical element. The optical system 10 can be installed in various electronic devices or portable electronic devices, such as a smart phone, for users to perform image capturing functions.

In this embodiment, the optical system 10 may include a base body 15, a first optical mechanism 100, a second optical mechanism 200, and a third optical mechanism 300. The base body 15 is, for example, a main circuit board of a portable electronic device, but it is not limited thereto. The first optical mechanism 100, the second optical mechanism 200, and the third optical mechanism 300 are disposed on the base body 15. It should be noted that the size of the base body 15 is not limited to the size illustrated in this figures.

The first optical mechanism 100 may include a fixed assembly FA, a first movable part 108 and a first driving assembly DA1. In this embodiment, as shown in FIG. 2, the fixed assembly FA includes a covering body 102 and a base 112, and the first movable part 108 may include a first holder 1081 and a first optical element 1082. The first holder 1081 is configured to connect and hold the first optical element

1082. The first optical element 1082 can serve as a light-shielding plate or a shutter, but it is not limited thereto. In other embodiments, the first optical element 1082 can also serve as a filter or an aperture.

The covering body 102 is fixedly disposed on the base 112, and the covering body 102 and the base 112 can be combined with each other to accommodate the first movable part 108 and the first driving assembly DA1. The first movable part 108 is movable relative to the fixed assembly FA, and the first driving assembly DA1 is configured to drive the first movable part 108 to move relative to the fixed assembly FA.

The first optical mechanism 100 may further include a guiding assembly GA configured to guide the movement of the first movable part 108 relative to the fixed assembly FA. A friction force can be generated by the first movable part 108 and the guiding assembly GA, and the first movable part 108 can be temporarily positioned at two relative positions on the fixed assembly FA by the friction force.

For example, the guiding assembly GA may be a first groove 1121 configured to accommodate the first holder 1081 and the first magnetic element MG1, and the friction force can be generated by the first holder 1081 and the first groove 1121.

The base 112 of the fixed assembly FA may include a first opening OP1 and a second opening OP2. The first opening OP1 is configured to allow a first light beam LT1 to pass through to enter the second optical mechanism 200, and the second opening OP2 is configured to allow a second light beam LT2 to pass through to enter the third optical mechanism 300. The first light beam LT1 is parallel to the second light beam LT2, and the first light beam LT1 is, for example, parallel to the Z-axis.

In this embodiment, the second optical mechanism 200 may be a camera module configured to receive the first light beam LT1 to capture an image. The third optical mechanism 300 may be a depth-sensing module configured to receive the second light beam LT2 to measure the distance between an object and the optical system 10.

In addition, correspondingly, the covering body 102 has a first light transmission portion 1021 and a second light transmission portion 1022, respectively corresponding to the first opening OP1 and the second opening OP2. The first light transmission portion 1021 and the second light transmission portion 1022 may be through holes, but they are not limited thereto. In other embodiments, the first light transmission portion 1021 and the second light transmission portion 1022 can also be made of transparent plastic material.

Figure 4:
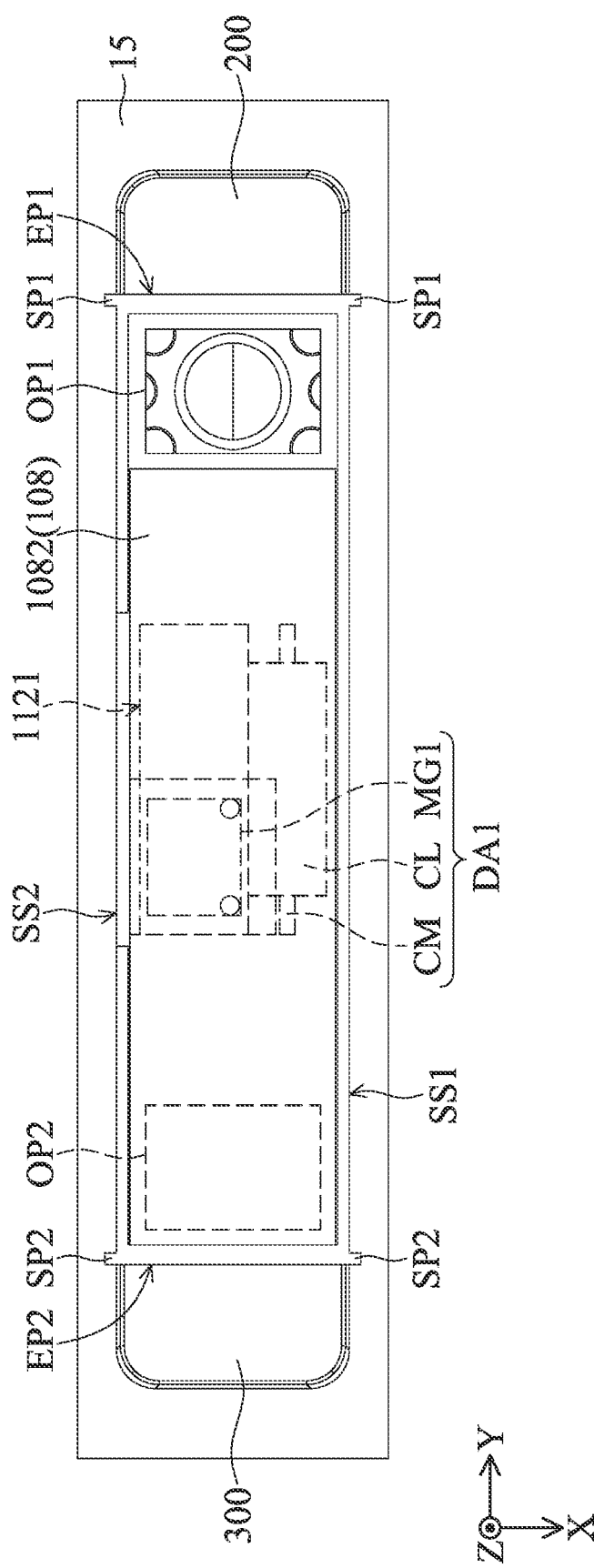
FIG. 4 is a top view of a partial structure of the optical system 10 according to an embodiment of the present disclosure.

Please refer to FIG. 1 to FIG. 4. FIG. 4 is a top view of a partial structure of the optical system 10 according to an embodiment of the present disclosure. When viewed along a first axis AX1 (the Z-axis), the first opening OP1 and the second opening OP2 are arranged along a second axis AX2. The first axis AX1 is parallel to the first light beam LT1, and the second axis AX2 is perpendicular to the first axis AX1.

When viewed along the first axis AX1, the first driving assembly DA1 and the first opening OP1 are arranged along the second axis AX2. When viewed along the second axis AX2, the first opening OP1 overlaps at least a part of the second opening OP2. That is, the first opening OP1 and the second opening OP2 can be located on the same plane.

As shown in FIG. 4, when viewed along the first axis AX1, the fixed assembly FA has a long strip-shaped structure extending along the second axis AX2. When viewed along the first axis AX1, the first opening OP1 is located on a first end portion EP1 of the fixed assembly FA. Similarly, when viewed along the first axis AX1, the second opening OP2 is located on a second end portion EP2 of the fixed assembly FA.

In this embodiment, the first driving assembly DA1 includes a coil CL, a first magnetic element MG1 and a magnetically conductive element CM. The first magnetic element MG1 corresponds to the coil CL, and the magnetically conductive element CM corresponds to the coil CL and has a magnetically conductive material.

The coil CL surrounds the magnetically conductive element CM, and the magnetically conductive element CM has a plate-shaped structure and is perpendicular to a third axis AX3. The third axis AX3 is perpendicular to the first axis AX1 and the second axis AX2. When viewed along the first axis AX1, the magnetically conductive element CM with a long strip-shaped structure extends along the second axis AX2.

As shown in FIG. 2, the first groove 1121 extends along the second axis AX2. As shown in FIG. 4, when viewed along the first axis AX1, the fixed assembly FA having a polygonal structure includes a first side SS1 and a second side SS2 that are parallel to each other.

When viewed along the first axis AX1, the shortest distance between the first groove 1121 and the first side SS1 is different from the shortest distance between the first groove 1121 and the second side SS2. As shown in FIG. 4, the shortest distance between the first groove 1121 and the first side SS1 is greater than the shortest distance between the first groove 1121 and the second side SS2.

As shown in FIG. 4, when viewed along the first axis AX1, the first groove 1121 does not overlap the magnetically conductive element CM. When viewed along the first axis AX1, the first groove 1121 does not overlap the center (for example, the center axis) of the coil CL.

The first holder 1081 is configured to hold the first magnetic element MG1, and the first holder 1081 may include a first upper cover 1083. The width of the first upper cover 1083 in the third axis AX3 is greater than the width of the first groove 1121 in the third axis AX3. As shown in FIG. 3, the first upper cover 1083 is configured to be in contact with an upper surface 112S of the base 112 of the fixed assembly FA.

In this embodiment, the first optical mechanism 100 further includes a supporting assembly SA configured to affix the fixed assembly FA to the base body 15. When viewed along the first axis AX1, the first opening OP1 is located between the supporting assembly SA and the first driving assembly DA1.

The supporting assembly SA and the fixed assembly FA can form a first accommodation space AS1, and at least a part of the second optical mechanism 200 is located in the first accommodation space AS1. Similarly, the second opening OP2 is located between the supporting assembly SA and the first driving assembly DA1. The supporting assembly SA and the fixed assembly FA can form a second accommodation space AS2, and at least a part of the third optical mechanism 300 is located in the second accommodation space AS2.

For example, the supporting assembly SA may include two first supporting elements SP1 and two second supporting elements SP2, and the first supporting elements SP1 and the second supporting elements SP2 may have a columnar structure, but it is not limited thereto. In other embodiments, the supporting element may have a flat plate-shaped structure or a U-shaped plate structure.

It should be noted that the first supporting element SP1 and the second supporting element SP2 may include shock-absorbing materials. Based on the design of the supporting assembly SA described above, the problem of the first end portion EP1 or the second end portion EP2 being disconnected from a central portion MP of the base 112 when the optical system 10 is impacted can be avoided.

In this embodiment, the optical system 10 can selectively shade the first opening OP1 or the second opening OP2. For example, when the first movable part 108 is located at a first preset position in FIG. 1 relative to the fixed assembly FA, and when viewed along the first axis AX1, the first optical element 1082 overlaps the first opening OP1. When the first movable part 108 is located at the first preset position, and when viewed along the first axis AX1, the first optical element 1082 and the second opening OP2 do not overlap.

When the second opening OP2 is to be closed, the coil CL can receive a current to act with the first magnetic element MG1 to generate a first electromagnetic driving fierce EF1 to drive the first movable part 108 to move along a first direction D1 from the first preset position in FIG. 1 to a second preset position in FIG. 4. When the first movable part 108 is located at the second preset position in FIG. 4 relative to the fixed assembly FA, and when viewed along the first axis AX1, the first optical element 1082 overlaps the second opening OP2. When the first movable part 108 is located at the second preset position, and when viewed along the first axis AX1 the first optical element 1082 does not overlap the first opening OP1.

As shown in FIG. 4, when viewed along the first axis AX1, the first driving assembly DA1 is located between the first opening OP1 and the second opening OP2. Furthermore, as shown in FIG. 3, the guiding assembly GA may further have a first track TK1 formed on the base 112 of the fixed assembly FA, and the first movable part 108 is configured to move along the first track TK1.

In addition, the guiding assembly GA may have a second track TK2 formed on the base body 15, but it is not limited thereto. In other embodiments the second track TK2 can be formed on the base 112. Similarly, the first movable part 108 is configured to move along the second track TK2.

As shown in FIG. 3, when viewed along the second axis AX2, the first track TK1 and the second track TK2 are located on opposite sides of the first movable part 108, such as the upper and lower sides of the first holder 1081. Based on the configuration of the first track TK1 and the second track TK2, the first movable part 108 can be moved stably along the second axis AX2.

When the first opening OP1 is to be closed again, the first driving assembly DA1 can generate the first electromagnetic driving force EF1 in the opposite direction to drive the first movable part 108 to move along a second direction D2 from the second preset position in FIG. 4 to the first preset position in FIG. 1. The first direction D1 is opposite the second direction D2.

Figure 5:
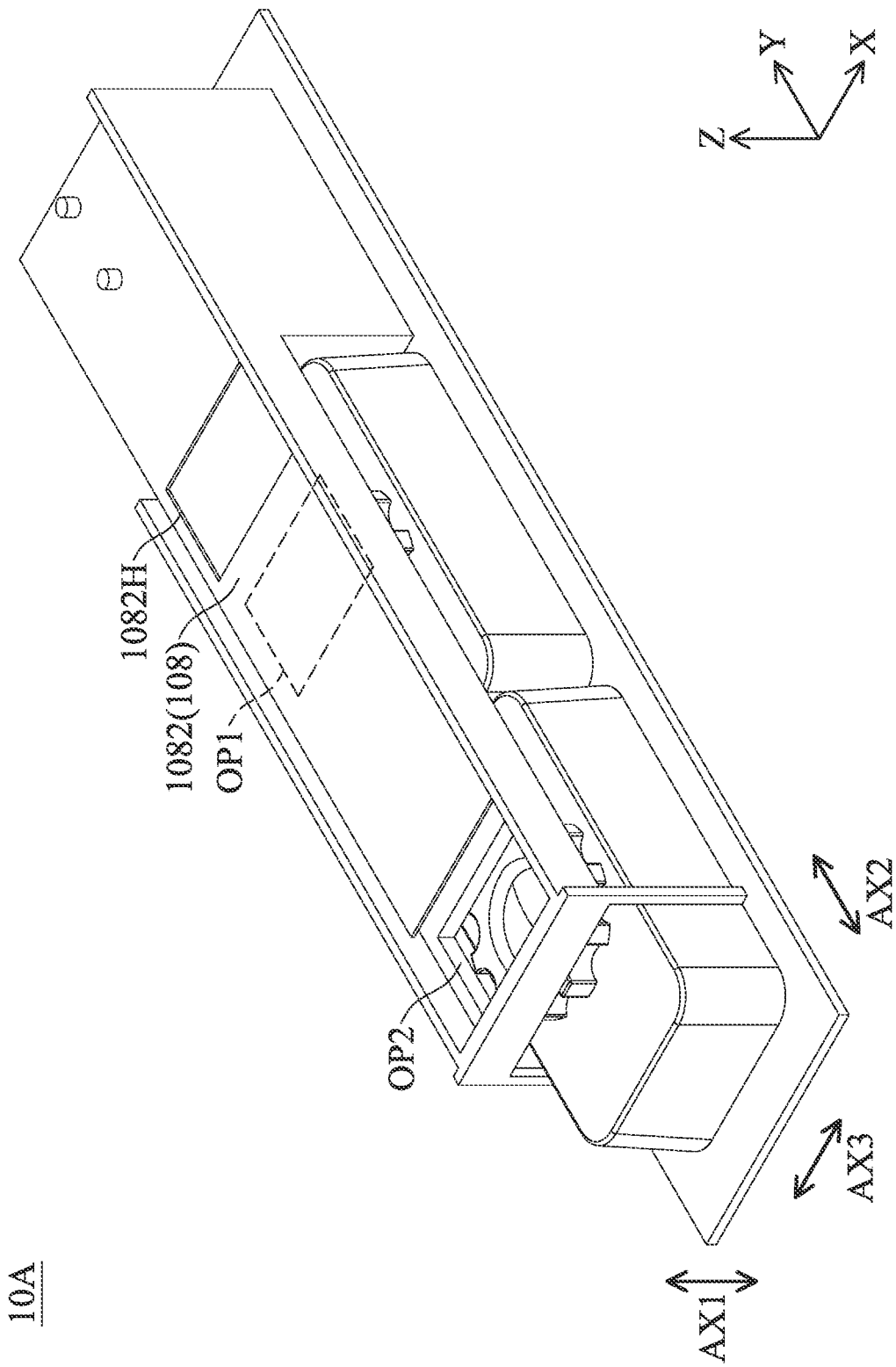
FIG. 5 is a perspective view of an optical system 10A according to an embodiment of the present disclosure.
Figure 6:
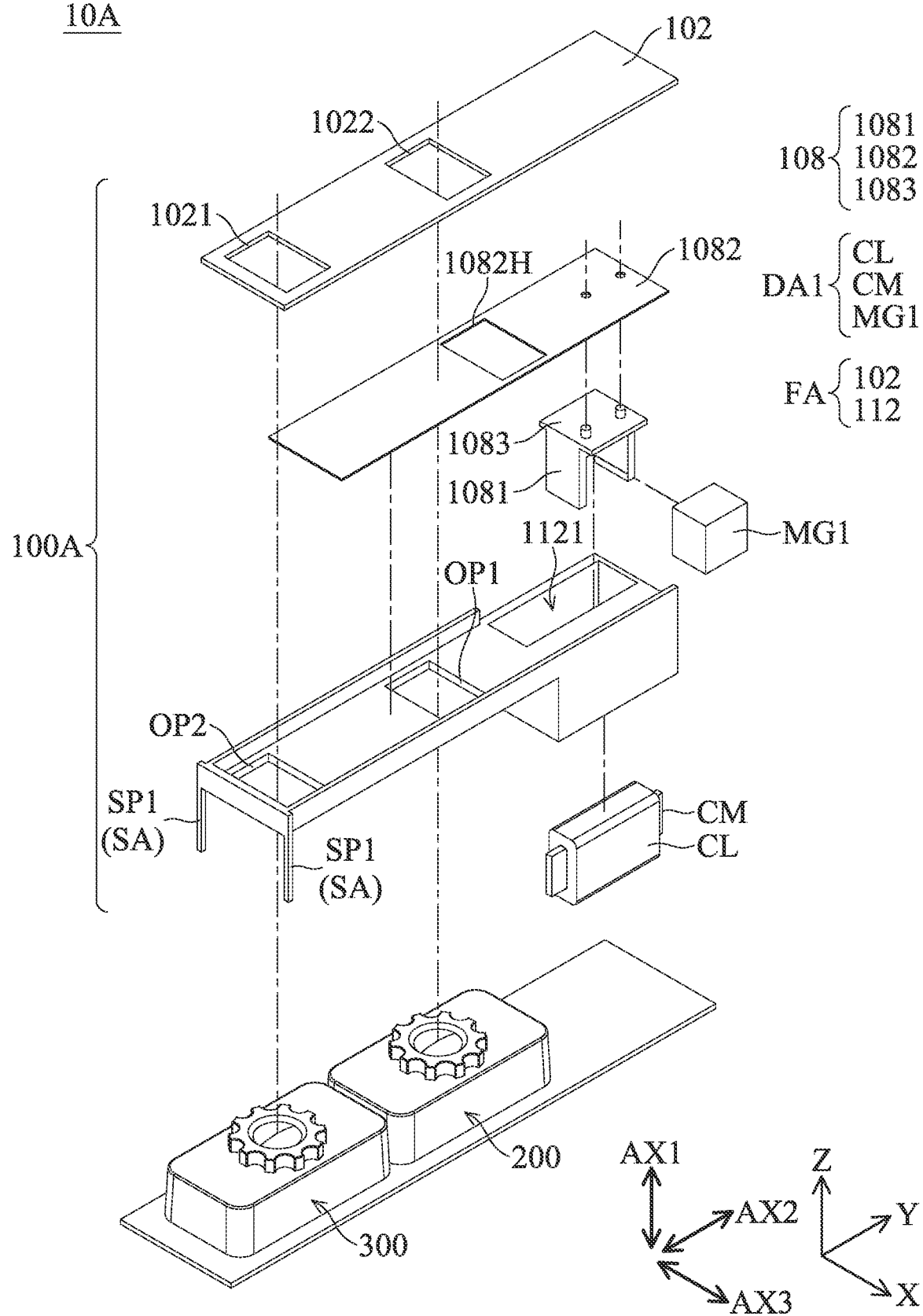
FIG. 6 is an exploded diagram of the optical system 10A according to an embodiment of the present disclosure.
Figure 7:
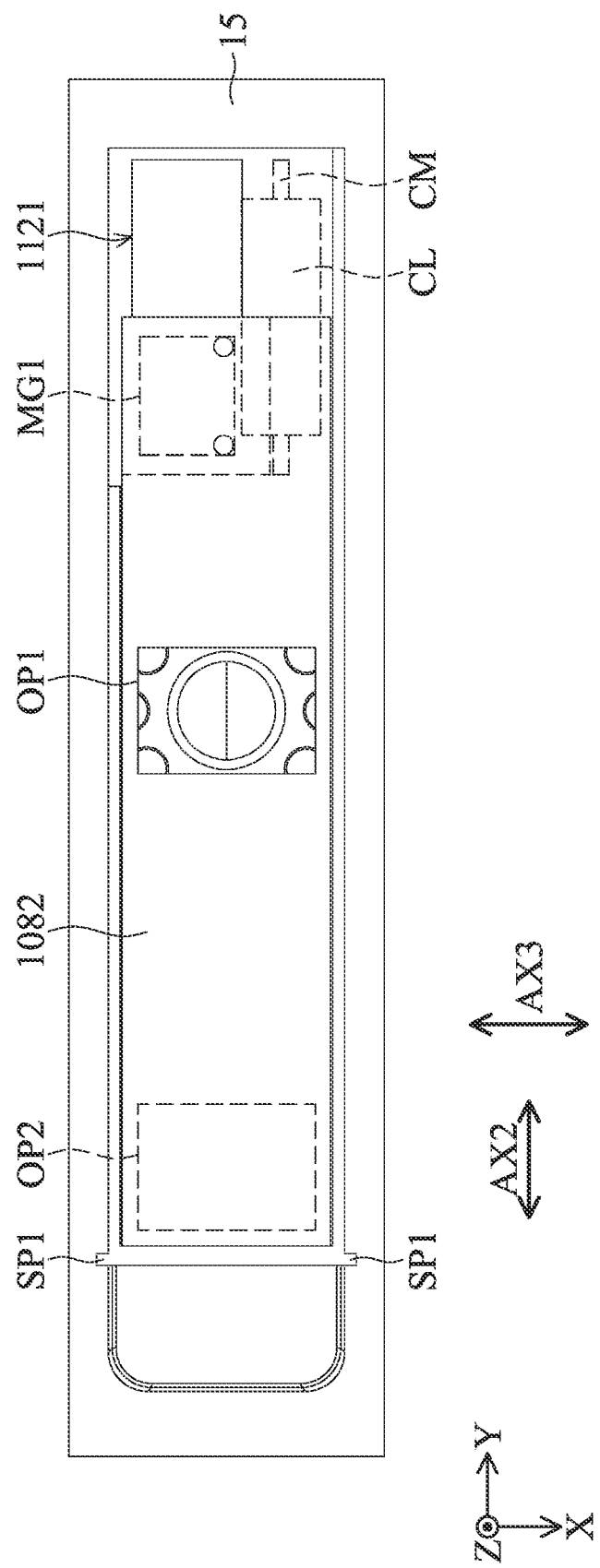
FIG. 7 is a top view of a partial structure of the optical system 10A according to an embodiment of the present disclosure.
Figure 8:
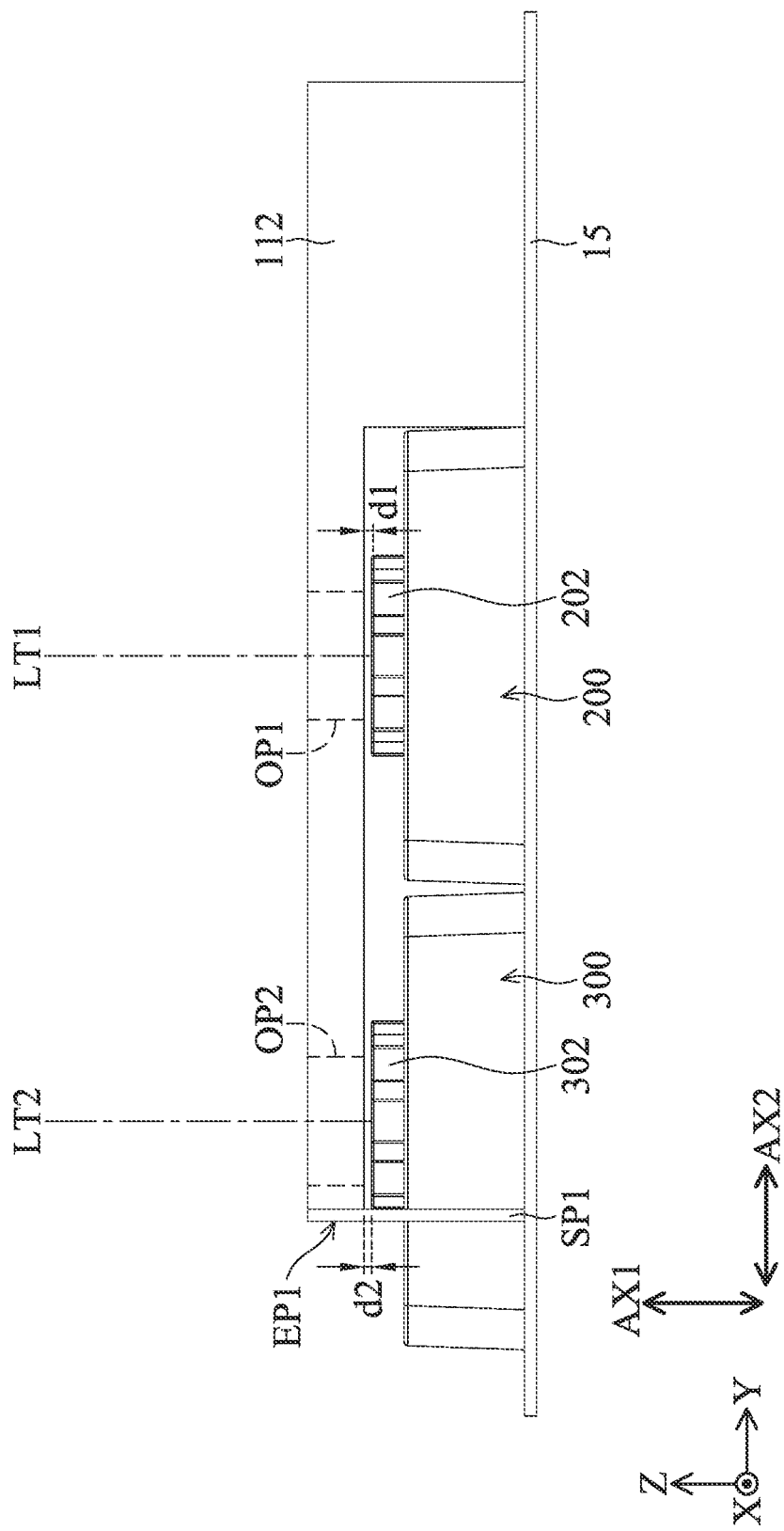
FIG. 8 is a side view of a partial structure of the optical system 10A according to an embodiment of the present disclosure.

Please refer to FIG. 5 to FIG. 8. FIG. 5 is a perspective view of an optical system 10A according to an embodiment of the present disclosure, FIG. 6 is an exploded diagram of the optical system 10A according to an embodiment of the present disclosure, FIG. 7 is a top view of a partial structure of the optical system 10A according to an embodiment of the present disclosure, and FIG. 8 is a side view of a partial structure of the optical system 10A according to an embodiment of the present disclosure.

The optical system 10A of this embodiment is similar to the optical system 10, having a first optical mechanism 100A, a second optical mechanism 200 and a third optical mechanism 300, and the first optical mechanism 100A includes a fixed assembly FA, a first movable part 108, and a first driving assembly DA1 As shown in FIG. 7, when viewed along the first axis AX1, the first opening OP1 is located between the second opening OP2 and the first driving assembly DA1. Similarly, as shown in FIG. 8, the second optical mechanism 200 and the third optical mechanism 300 are disposed on the base body 15 and are located on the same plane (the XY plane).

A second camera lens 202 of the second optical mechanism 200 corresponds to the first opening ON and is configured to receive the first light beam LT1. A third camera lens 302 of the third optical mechanism 300 corresponds to the second opening OP2 and is configured to receive the second light beam LT2. The size of the first opening OP1 is the same as the size of the second opening OP2, but the aperture (the hole diameter) of the second camera lens 202 is different from the aperture of the third camera lens 302.

For example, the aperture of the second camera lens 202 is larger than the aperture of the third camera lens 302, and a distance d1 between the second camera lens 202 and the first opening OP1 in the first axis AX1 is shorter than a distance d2 between the third camera lens 302 and second opening OP2 in the first axis AX1.

The operation of the optical system 10A is as follows. When the first movable part 108 is located at the first preset position in FIG. 5 relative to the fixed assembly FA, and when viewed along the first axis AX1, the first optical element 1082 overlaps the first opening OP1. When the first movable part 108 is located at the first preset position, and when viewed along the first axis AX1, the first optical element 1082 and the second opening OP2 do not overlap.

Furthermore, the first driving assembly DA1 can generate an electromagnetic driving force (such as the first electromagnetic driving force EF1) to drive the first movable part 108 to move to the second preset position, thereby closing the second opening OP2. When the first movable part 108 is located at the second preset position in FIG. 7 relative to the fixed assembly FA, and when viewed along the first axis AX1, the first optical element 1082 overlaps the second opening OP2. When the first movable part 108 is located at the second preset position, and when viewed along the first axis AX1, the first optical element 1082 does not overlap the first opening OP1. Specifically, a penetrating portion 1082H may be formed on the first optical element 1082, so that the light beam (such as the first light beam LT1) passes through the penetrating portion 1082H to arrive at the second optical mechanism 200. The penetrating portion 1082H is, for example, an opening, but it is not limited thereto.

In addition, in this embodiment, as shown in FIG. 8, when viewed along the third axis AX3, the base 112 has an L-shaped structure, and two first supporting elements SP1 may be disposed on the first end portion EP1 of the base 112 so as to support the first optical mechanism 100A on the base body 15.

Figure 9:
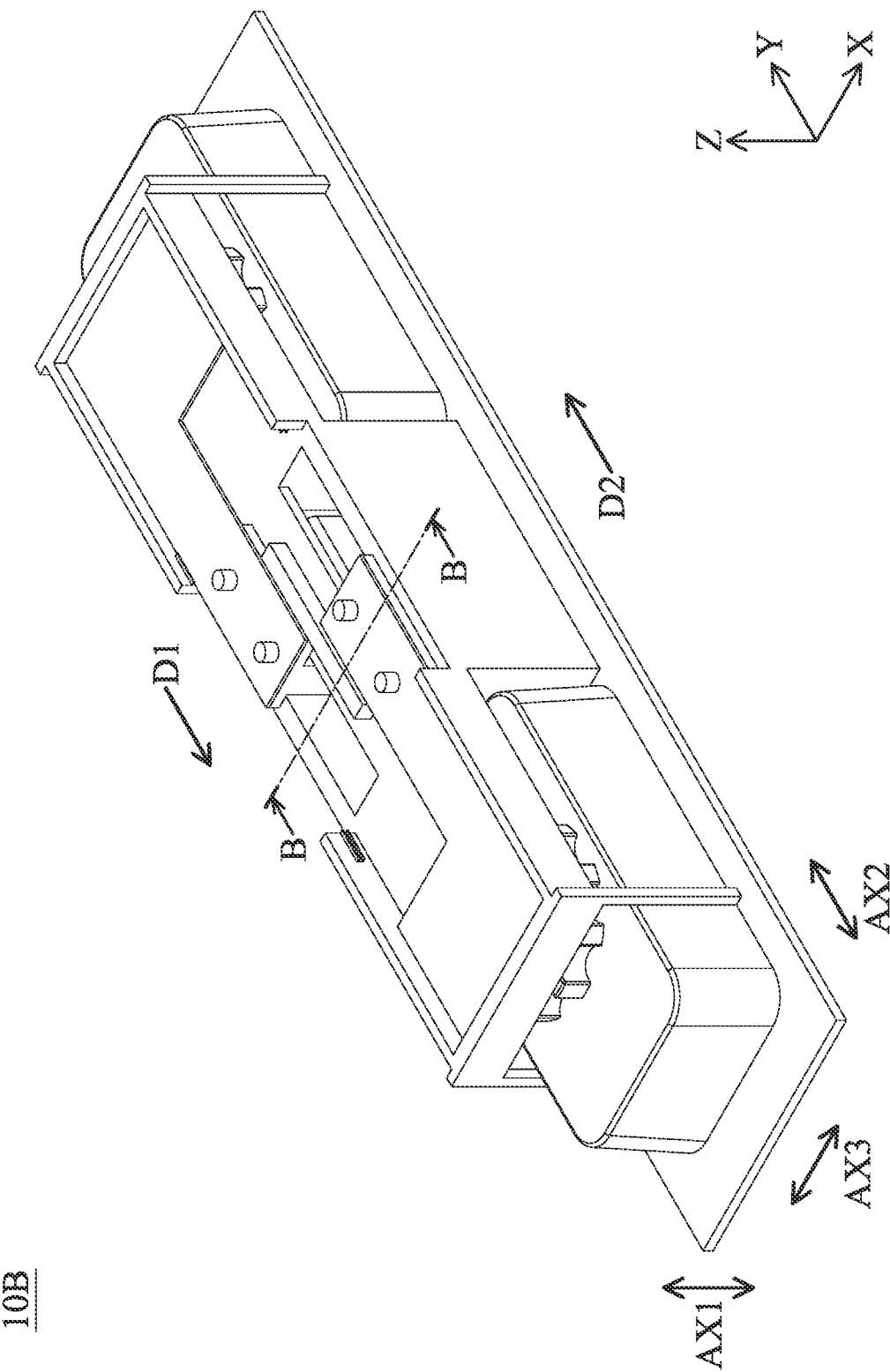
FIG. 9 is a perspective view of an optical system 10B according to an embodiment of the present disclosure.
Figure 10:
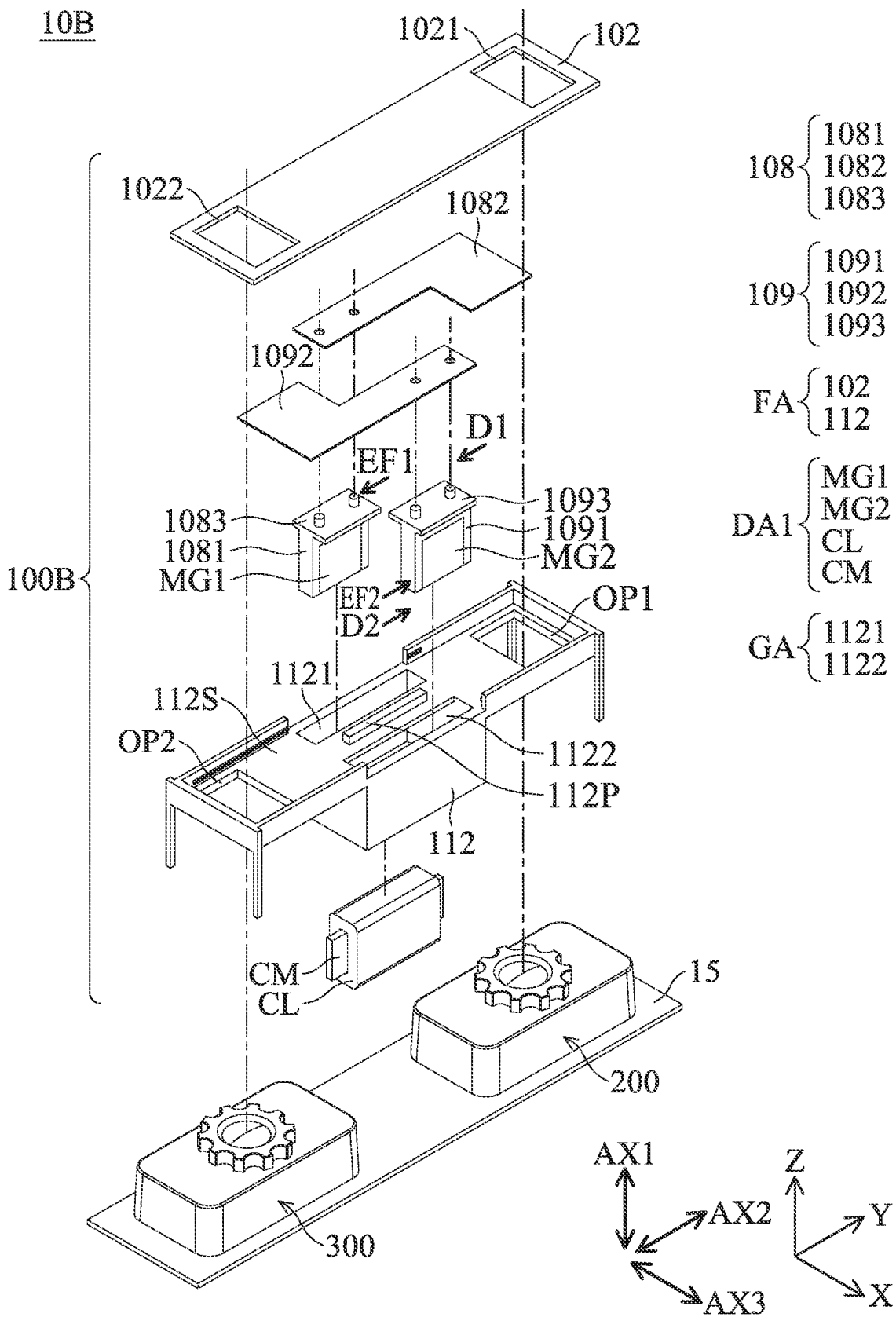
FIG. 10 is an exploded diagram of the optical system 10B according to an embodiment of the present disclosure.
Figure 11:
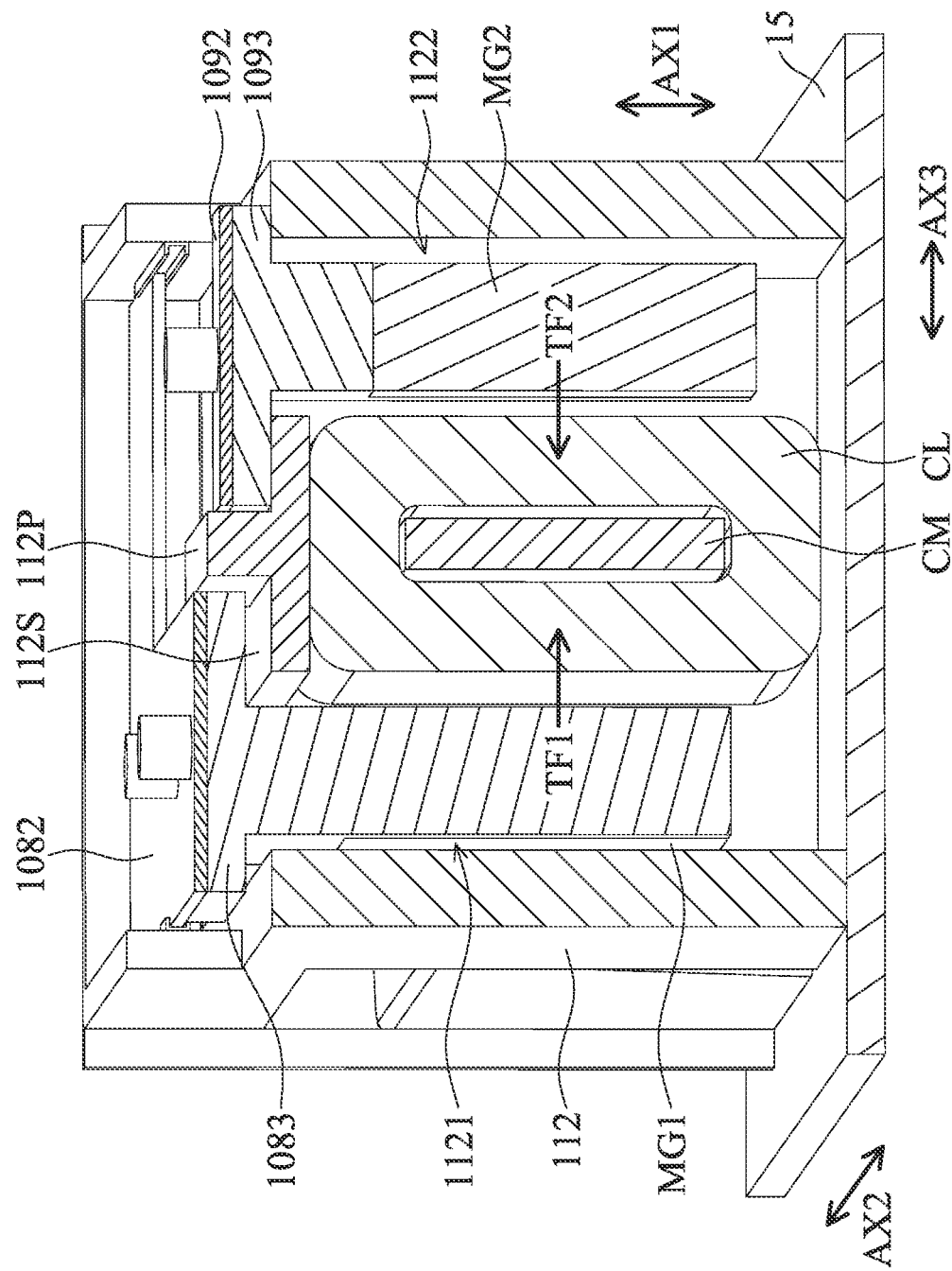
FIG. 11 is a cross-sectional view of the optical system 10B along the line B-B in FIG. 9 according to an embodiment of the present disclosure.
Figure 12:
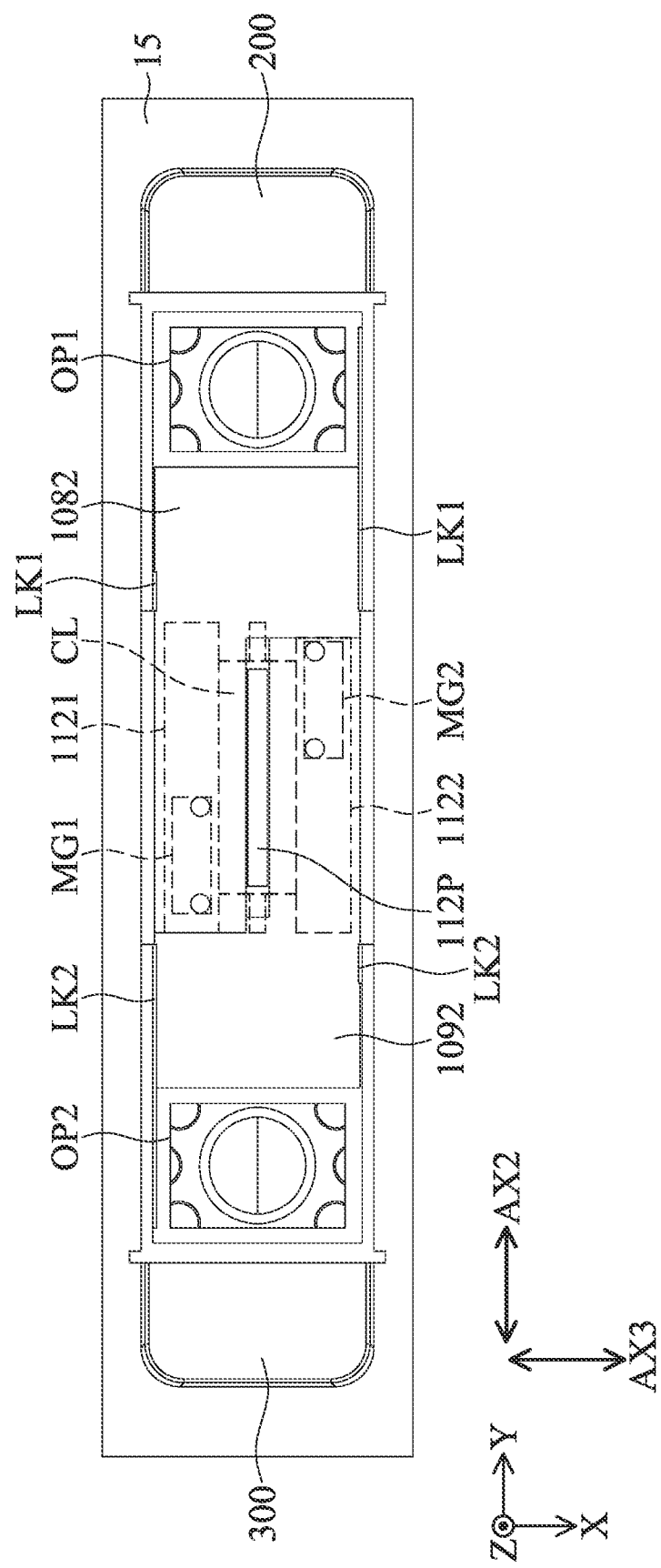
FIG. 12 is a top view of a partial structure of the optical system 10B according to an embodiment of the present disclosure.

Please continue to refer to FIG. 9 to FIG. 12. FIG. 9 is a perspective view of an optical system 10B according to an embodiment of the present disclosure. FIG. 10 is an exploded diagram of the optical system 10B according to an embodiment of the present disclosure, FIG. 11 is a cross-sectional view of the optical system 10B along the line B-B in FIG. 9 according to an embodiment of the present disclosure, and FIG. 12 is a top view of a partial structure of the optical system 10B according to an embodiment of the present disclosure.

The optical system 10B of this embodiment is similar to the aforementioned optical system 10, including a first optical mechanism 100B, a second optical mechanism 200 and a third optical mechanism 300, and the first optical mechanism 100B includes the fixed assembly FA, the first movable part 108 and the first driving assembly DA1. As shown in FIG. 12, when viewed along the first axis AX1, the first driving assembly DA1 is located between the first opening OP1 and the second opening OP2.

In addition, in this embodiment, the first optical mechanism 100 further includes a second movable part 109 configured to move along the second axis AX2 relative to the fixed assembly FA. The second movable part 109 includes a second holder 1091 and a second optical element 1092, and the second holder 1091 is configured to connect to and hold the second optical element 1092. Furthermore, the first driving assembly DA1 may further include a second magnetic element MG2 corresponding to the coil CL, and the second holder 1091 is configured to hold the second magnetic element MG2.

Similarly, the second holder 1091 has a second upper cover 1093, and the second upper cover 1093 is configured to be in contact with the upper surface 112S.

In addition to the first groove 1121, the guiding assembly GA may further include a second groove 1122 configured to accommodate the second holder 1091 and the second magnetic element MG2, and a frictional force is generated by the second holder 1091 and the second groove 1122. The second groove 1122 extends along the second axis AX2, and the width of the second upper cover 1093 in the third axis AX3 is greater than the width of the second groove 1122 in the third axis AX3.

In this embodiment, as shown in FIG. 11, when viewed along the second axis AX2, the coil CL is located between the first magnetic element MG1 and the second magnetic element MG2. When the coil CL receives a current, the first magnetic element MG1 and the second magnetic element MG2 respectively induce a first electromagnetic driving force EH and a second electromagnetic driving force EF2 with the coil CL.

The first electromagnetic driving force EF1 and the second electromagnetic driving force EF2 drive the first movable part 108 and the second movable part 109 to move at the same time along a first direction D1 and a second direction D2, respectively. For example, the first electromagnetic driving force EF1 and the second electromagnetic driving force EF2 respectively drive the first movable part 108 and the second movable part 109 to move from the first preset position in FIG. 9 to the second preset position in FIG. 12. The first direction D1 and the second direction D2 are parallel to the second axis AX2, and the first direction D1 is opposite the second direction D2.

It should be noted that, in this embodiment, the first magnetic element MG1 and the second magnetic element MG2 have different sizes, different materials, different forming methods, and different weights.

In this embodiment, the base 112 of the fixed assembly FA may further include a separating element 112P, which extends from the upper surface 112S along the first axis AX1. When viewed along the first axis AX1, the separating element 112P is located between the first groove 1121 and the second groove 1122.

As shown in FIG. 11, a first magnetic attraction force TF1 is generated between the first magnetic element MG1 and the magnetically conductive element CM. When viewed along the second axis AX2, the first magnetic attraction TF1 drives the first upper cover 1083 to contact the separating element 112P. Similarly, a second magnetic attraction force TF2 is generated between the second magnetic element MG2 and the magnetically conductive element CM. When viewed along the second axis AX2, the second magnetic attraction force TF2 drives the second upper cover 1093 to contact the separating element 112P.

Based on the above structural configuration, the separating element 112P can avoid the collision between the first movable part 108 and the second movable part 109, so that the first movable part 108 and the second movable part 109 can smoothly move along the first groove 1121 and the second groove 1122, respectively.

Figure 13:
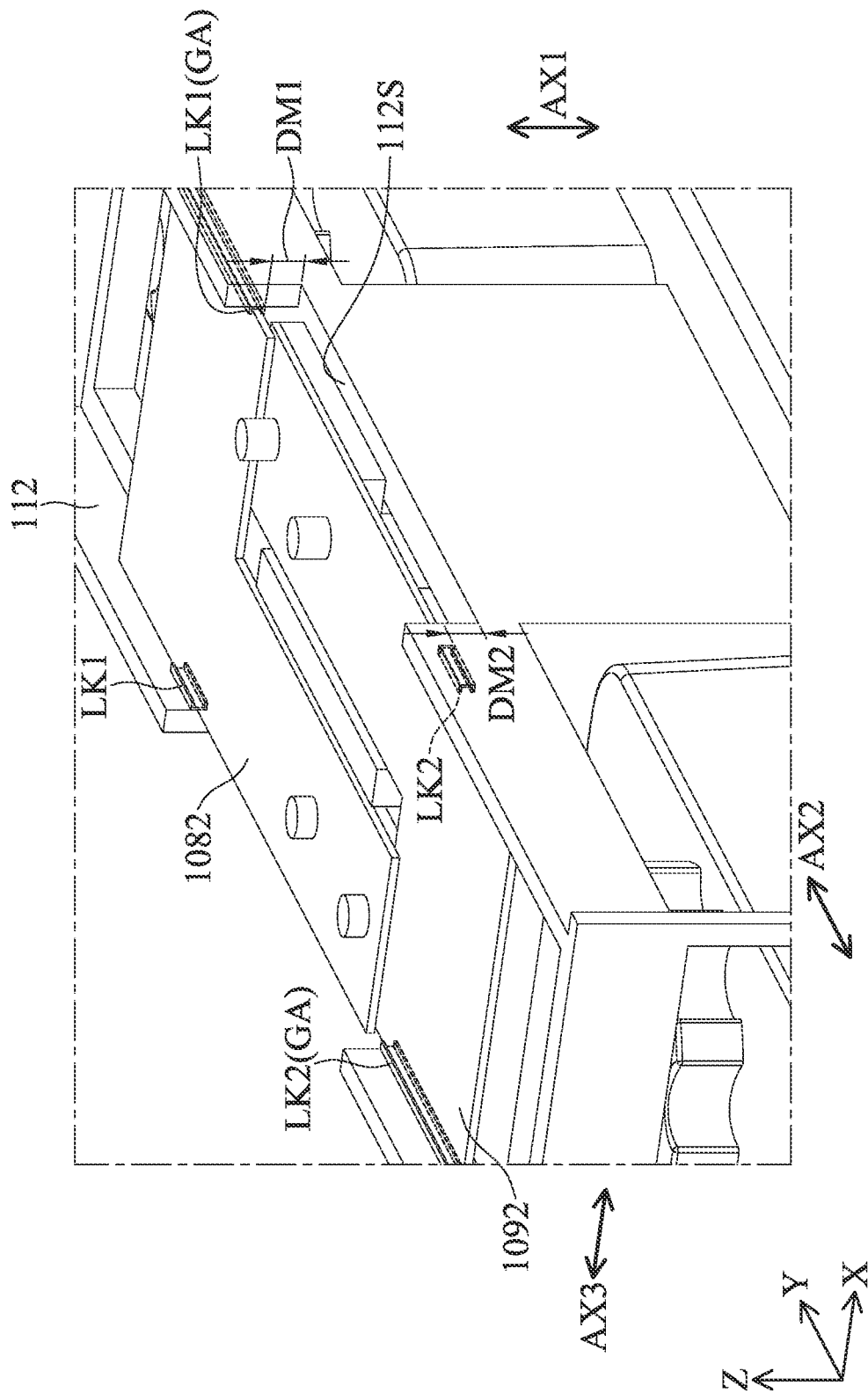
FIG. 13 is an enlarged diagram of the optical system 10B according to an embodiment of the present disclosure.

Please refer to FIG. 13, which is an enlarged diagram of the optical system 10B according to an embodiment of the present disclosure. In this embodiment, the guiding assembly GA may further include a first lateral sliding track LK1 formed on the base 112 of the fixed assembly FA, and the first lateral sliding track LK1 is configured to guide the first optical element 1082. The guiding assembly GA may further include a second lateral sliding track LK2 formed on the base 112 of the fixed assembly FA. The second lateral sliding track LK2 is configured to guide the second optical element 1092.

As shown in FIG. 13, when the first movable part 108 and the second movable part 109 are located at the second preset position relative to the fixed assembly FA, and when viewed along the second axis AX2, the shortest distance DM1 between the first optical element 1082 and the upper surface 112S is different from the shortest distance DM2 between the second optical element 1092 and the upper surface 112S.

Specifically, the shortest distance DM1 between the first optical element 1082 and the upper surface 112S is greater than the shortest distance DM2 between the second optical element 1092 and the upper surface 112S. As shown in FIG. 12 and FIG. 13, when the first movable part 108 and the second movable part 109 are located at the second preset position relative to the fixed assembly FA, and when viewed along the first axis AX1, the first optical element 1082 overlaps at least a part of the second optical element 1092.

In addition, as shown in FIG. 12, in order to ensure that the first movable part 108 and the second movable part 109 move stably, the lengths of the two first lateral sliding tracks LK1 may be different, and the length of the two second lateral sliding tracks LK2 can also be different. For example, the length of the first lateral sliding track LK1 at the lower side in FIG. 12 is greater than the length of the first lateral sliding track LK1 at the upper side. Based on the above structural configuration, it can be ensured that the first movable part 108 and the second movable part 109 do not collide with each other and cause damage when they move toward the center of the first optical mechanism 100B.

In the optical system 10B, the first opening OP1 and the second opening OP2 are opened or closed at the same time. For example, when the first movable part 108 and the second movable part 109 are located at the first preset position in FIG. 9 relative to the fixed assembly FA, and when viewed along the first axis AX1, the first optical element 1082 overlaps the first opening OP1. At this time, when viewed along the first axis AX1, the second optical element 1092 overlaps the second opening OP2.

When the first movable part 108 and the second movable part 109 are located at the second preset position relative to the fixed assembly FA, and when viewed along the first axis AX1 as shown in FIG. 12, the first optical element 1082 does not overlap the first opening OP1. At this time, when viewed along the first axis AX1, the second optical element 1092 does not overlap the second opening OP2.

When the first opening OP1 and the second opening OP2 are to be opened again at the same time, the coil CL can receive a reverse current corresponding to the aforementioned current, so that the first electromagnetic driving force EF1 and the second electromagnetic driving force EF2 respectively drive the first movable part 108 and the second movable part 109 back to the first preset position in FIG. 9.

Figure 14:
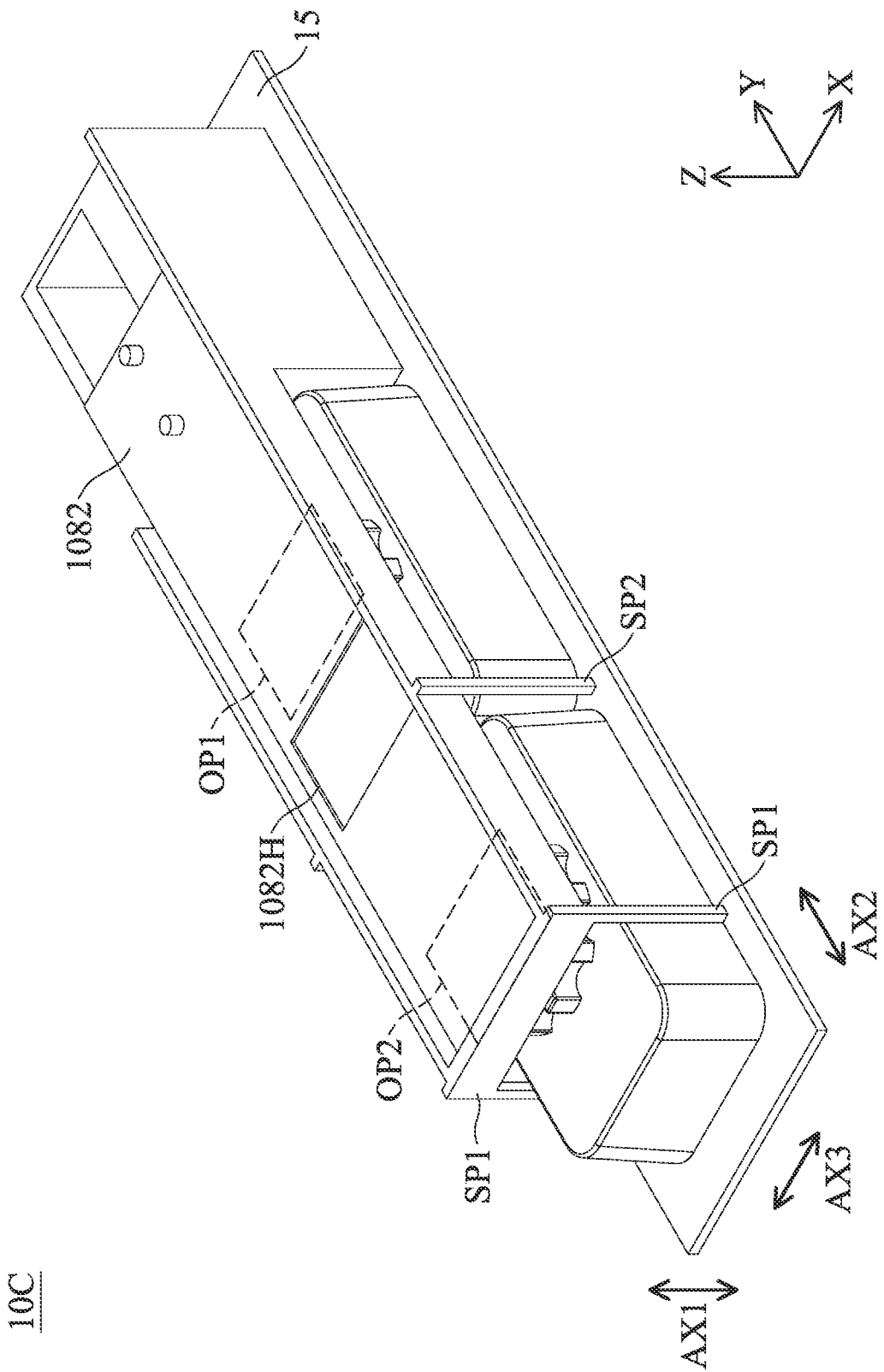
FIG. 14 is a perspective view of an optical system 10C according to an embodiment of the present disclosure.
Figure 15:
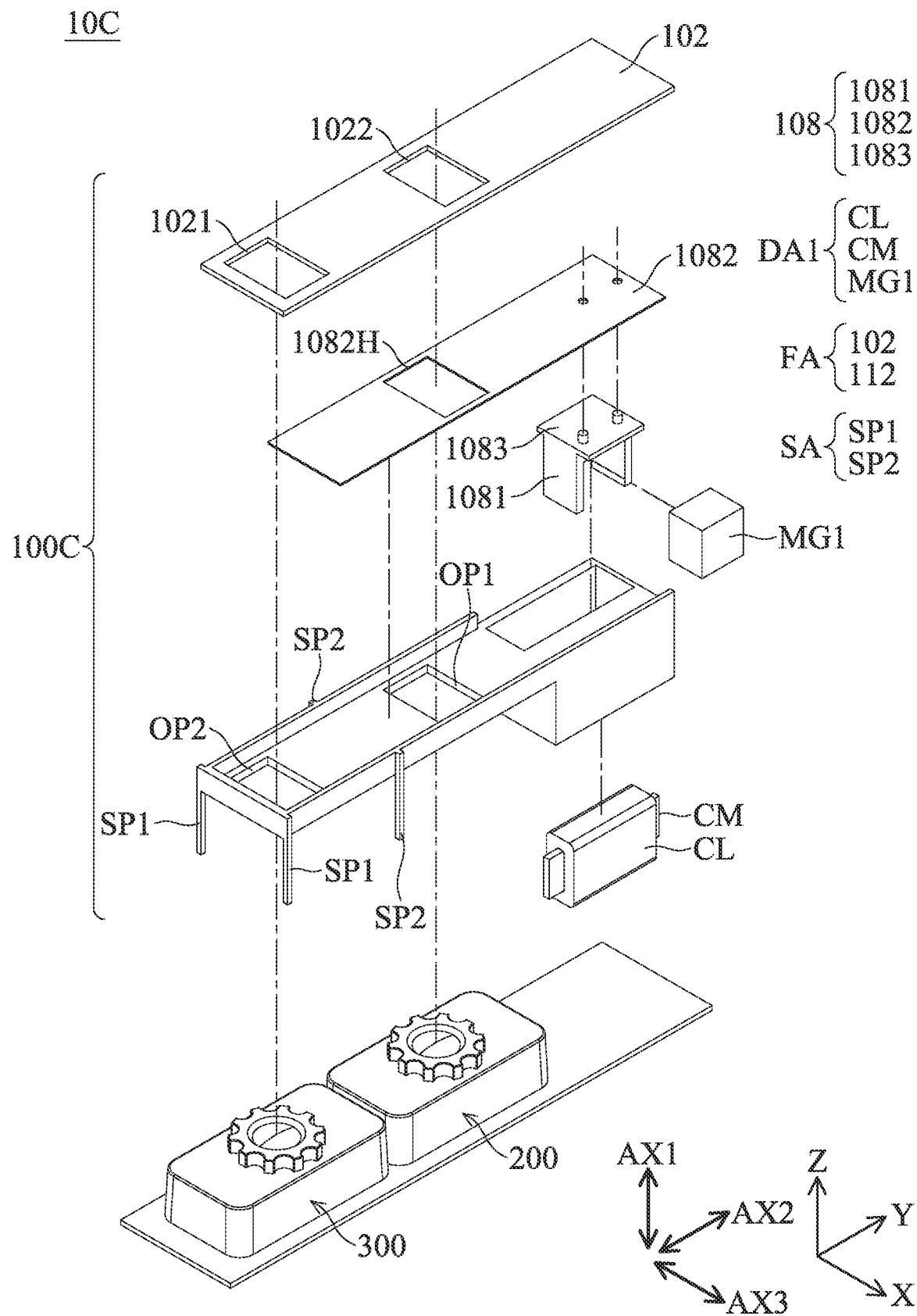
FIG. 15 is an exploded diagram of the optical system 10C according to an embodiment of the present disclosure.
Figure 16:
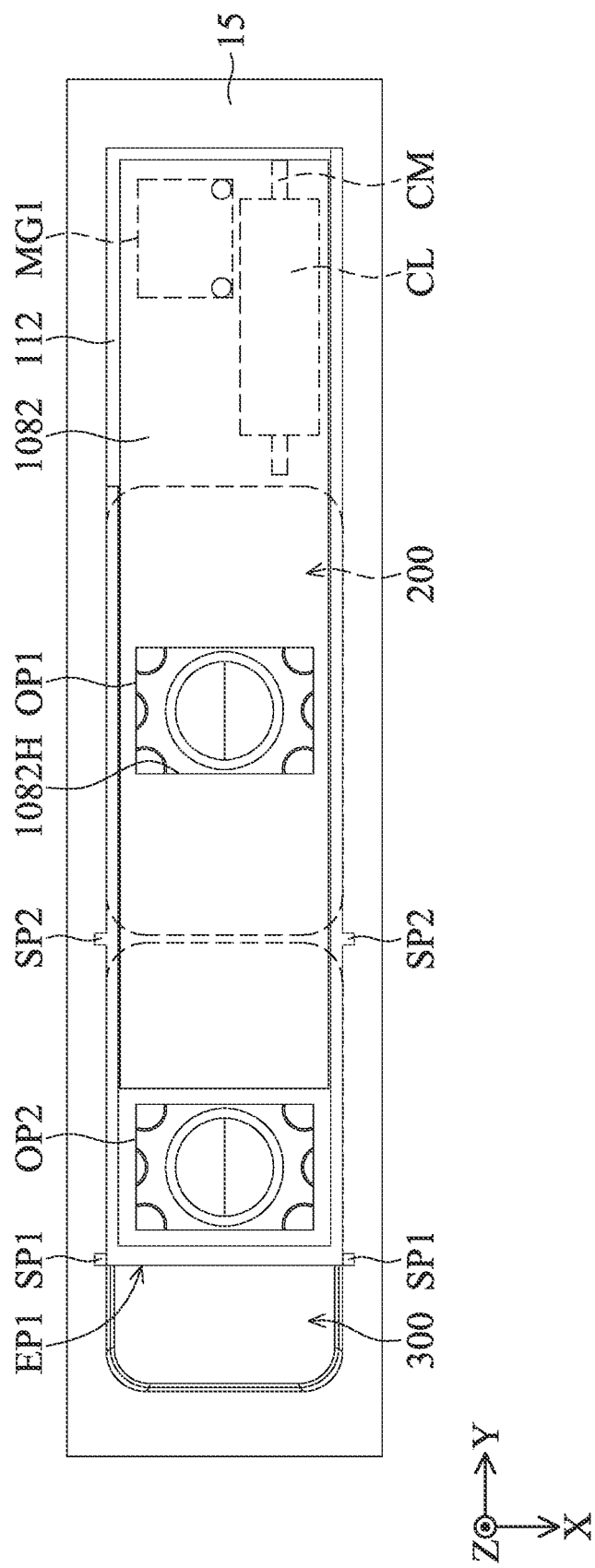
FIG. 16 is a top view of a partial structure of the optical system 10C according to an embodiment of the present disclosure.

Please refer to FIG. 14 to FIG. 16. FIG. 14 is a perspective view of an optical system 10C according to an embodiment of the present disclosure, FIG. 15 is an exploded diagram of the optical system IDC according to an embodiment of the present disclosure, and FIG. 16 is a top view of a partial structure of the optical system 10C according to an embodiment of the present disclosure. The optical system 10C of this embodiment is similar to the optical system 10A, including a first optical mechanism 100C, the second optical mechanism 200 and the third optical mechanism 300, and the first optical mechanism 100C includes the fixed assembly FA, the first movable part 108, and the first driving assembly DA1.

When viewed along the first axis AX1, the first opening OP1 is located between the second opening OP2 and the first driving assembly DA1. Similarly, the first optical element 1082 has a penetrating portion 1082H, and the penetrating portion 1082H has a rectangular structure.

When the first movable part 108 is located at the first preset position in FIG. 14 relative to the fixed assembly FA, and when viewed along the first axis AX1, the penetrating portion 1082H is located between the first opening OP1 and the second opening OP2, and the penetrating portion 1082H overlaps the base 112. At this time, the first optical element 1082 overlaps the first opening OPT and the second opening OP2. That is, the first opening OP1 and the second opening OP2 are shaded by the first optical element 1082 at the same time.

In addition, when the first driving assembly DA1 drives the first movable part 108 to move to the second preset position in FIG. 16, and when viewed along the first axis AX1, the first optical element 1082 does not overlap the first opening OP1 and the second opening OP2, and the penetrating portion 1082H overlaps the first opening OP1. At this time, the first opening OP1 and the second opening OP2 are opened at the same time.

In this embodiment, the supporting assembly SA may further include two first supporting elements SP1 and two second supporting elements SP2. The first supporting elements SP1 are disposed on the first end portion EP1 and the second supporting elements SP2 are located between the second optical mechanism 200 and the third optical mechanism 300. Based on the design of the supporting assembly SA described above, the problem of damage to the first end portion EP1 when the optical system 10 is impacted can be further avoided.

As for the operation of the first driving assembly DA1 driving the first movable part 108 to move relative to the fixed assembly FA is the same as that of the optical system 10A so it is not repeated herein.

This disclosure provides an optical system including a first optical mechanism, a second optical mechanism 200 and a third optical mechanism 300. The base 112 of the first optical mechanism has a first opening OP1 and a second opening OP2 respectively corresponding to the second optical mechanism 200 and the third optical mechanism 300. In some embodiments, the first driving assembly DA1 of the first optical mechanism can drive the first movable part 108 to move to selectively shade the first opening OP1 or the second opening OP2 individually, or shade the first opening OP1 and the second opening OP2 at the time.

In some embodiments, the first driving assembly DA1 of the first optical mechanism may include two magnetic elements and a corresponding coil CL to respectively drive the first movable part 108 and the second movable part 109 to move to shade or open the first opening OP1 and second opening OP2 at the same time. The several embodiments of the present disclosure can be applied to different electronic devices according to actual needs.

Based on the above-mentioned structural configuration, the optical system can be miniaturized, and the number of components and the production cost can be reduced.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising a first optical mechanism, the first optical mechanism including:
   a first movable part, including a first optical element;
   a fixed assembly, wherein the first movable part is movable relative to the fixed assembly;
   a first driving assembly, configured to drive the first movable part to move relative to the fixed assembly; and
   a guiding assembly, configured to guide the first movable part to move relative to the fixed assembly, wherein a friction force is generated by the first movable part and the guiding assembly, and the first movable part is temporarily positioned on the fixed assembly through the friction force;
   wherein the fixed assembly includes:
   a first opening, configured to allow a first light beam to pass through to enter a second optical mechanism; and
   a second opening, configured to allow a second light beam to pass through to enter a third optical mechanism;
   wherein the first light beam is parallel to the second light beam;
   the second optical mechanism includes a camera module configured to capture an image;
   the third optical mechanism includes a depth-sensing module configured to measure distance;
   when viewed along a first axis, the first opening and the second opening are arranged along a second axis;
   the first axis is parallel to the first light beam;
   the second axis is perpendicular to the first axis;
   wherein when viewed along the first axis, the first driving assembly and the first opening are arranged along the second axis;
   when viewed along the second axis, the first opening overlaps at least a part of the second opening;
   when viewed along the first axis, the fixed assembly has a long strip-shaped structure extending along the second axis;

when viewed along the first axis, the first opening is located on a first end portion of the fixed assembly;
wherein the first optical mechanism further includes a supporting assembly configured to affix the fixed assembly to a base body of the optical system;
when viewed along the first axis, the first opening is located between the supporting assembly and the first driving assembly;
the supporting assembly and the fixed assembly form a first accommodation space;
at least a part of the second optical mechanism is located in the first accommodation space;
the supporting assembly includes a first supporting element, and the first supporting element has a columnar structure, a flat plate-shaped structure, or a U-shaped plate structure;
the first supporting element includes a shock-absorbing material.

2. The optical system as claimed in claim 1, wherein the first driving assembly includes:
a coil;
a first magnetic element, corresponding to the coil; and
a magnetically conductive element, corresponding to the coil and having a 6 magnetically conductive material;
wherein the coil surrounds the magnetically conductive element;
the magnetically conductive element has a plate-shaped structure and is perpendicular to a third axis;
the third axis is perpendicular to the first axis and the second axis;
when viewed along the first axis, the magnetically conductive element with a long strip-shaped structure extends along the second axis.

3. The optical system as claimed in claim 2, wherein the guiding assembly has a first groove configured to accommodate the first magnetic element;
the first groove extends along the second axis;
when viewed along the first axis, the fixed assembly having a polygonal structure includes a first side and a second side that are parallel to each other;
when viewed along the first axis, a shortest distance between the first groove and the first side is different from a shortest distance between the first groove and the second side;
when viewed along the first axis, the first groove does not overlap the magnetically conductive element;
when viewed along the first axis, the first groove does not overlap the center of the coil.

4. The optical system as claimed in claim 3, wherein the first movable part further includes a first holder configured to hold the first magnetic element;
the first holder has a first upper cover;
a width of the first upper cover in the third axis is greater than a width of the first groove in the third axis;
the first upper cover is configured to contact an upper surface of the fixed assembly.

5. The optical system as claimed in claim 4, wherein when the first movable part is located at a first preset position relative to the fixed assembly, and when viewed along the first axis, the first optical element overlaps the first opening;
when the first movable part is located at the first preset position, and when viewed along the first axis, the first optical element and the second opening do not overlap;
when the first movable part is located at a second preset position relative to the fixed assembly, and when viewed along the first axis, the first optical element overlaps the second opening;
when the first movable part is located at the second preset position, and when viewed along the first axis, the first optical element does not overlap the first opening.

6. The optical system as claimed in claim 5, wherein when viewed along the first axis, the first driving assembly is located between the first opening and the second opening;
the guiding assembly includes a first track formed on the fixed assembly;
the first movable part is configured to move along the first track.

7. The optical system as claimed in claim 6, wherein the guiding assembly further includes a second track formed on the fixed assembly or the base body;
the first movable part is configured to move along the second track;
when viewed along the second axis, the first track and the second track are located on opposite sides of the first movable part.

8. The optical system as claimed in claim 5, wherein when viewed along the first axis, the first opening is located between the second opening and the first driving assembly;
the second optical mechanism and the third optical mechanism are disposed on the base body and located on the same plane;
the second optical mechanism has a second camera lens corresponding to the first opening;
the third optical mechanism has a third camera lens corresponding to the second opening;
a size of the first opening is the same as a size of the second opening;
an aperture of the second camera lens is different from an aperture of the third camera lens.

9. The optical system as claimed in claim 8, wherein the aperture of the second camera lens is larger than the aperture of the third camera lens;
a distance between the second camera lens and the first opening in the first axis is shorter than a distance between the third camera lens and the second opening in the first axis.

10. The optical system as claimed in claim 4, wherein
when the first movable part is located at a first preset position relative to the fixed assembly, and when viewed along the first axis, the first optical element overlaps the first opening;
when the first movable part is located at the first preset position, and when viewed along the first axis, the first optical element overlaps the second opening.

11. The optical system as claimed in claim 10, wherein when the first movable part is located at a second preset position relative to the fixed assembly, and when viewed along the first axis, the first optical element does not overlap the first opening;
when the first movable part is located at the second preset position, and when viewed along the first axis, the first optical element does not overlap the second opening.

12. The optical system as claimed in claim 11, wherein when viewed along the first axis, the first driving assembly is located between the first opening and the second opening;
the first optical mechanism further includes a second movable part configured to move along the second axis relative to the fixed assembly;
the second movable part includes a second optical element;
the first driving assembly further includes a second magnetic element corresponding to the coil;
the second movable part further includes a second holder configured to hold the second magnetic element.

13. The optical system as claimed in claim 12, wherein the second holder has a second upper cover;
- the second upper cover is configured to contact the upper surface;
- the guiding assembly further has a second groove configured to accommodate the second magnetic element;
- the second groove extends along the second axis;
- a width of the second upper cover in the third axis is greater than a width of the second groove in the third axis;
- when viewed along the second axis, the coil is located between the first magnetic element and the second magnetic element;
- when the coil is provided with electricity, the first magnetic element and the second magnetic element respectively induce a first electromagnetic driving force and a second electromagnetic driving force with the coil;
- the first electromagnetic driving force and the second electromagnetic driving force respectively drive the first movable part and the second movable part to move in a first direction and a second direction at the same time;
- the first direction is opposite the second direction.

14. The optical system as claimed in claim 13, wherein the fixed assembly further includes a separating element extending along the first axis from the upper surface;
- when viewed along the first axis, the separating element is located between the first groove and the second groove;
- a first magnetic attraction force is generated between the first magnetic element and the magnetically conductive element;
- when viewed along the second axis, the first magnetic attraction force drives the first upper cover to contact the separating element:
- a second magnetic attraction force is generated between the second magnetic element and the magnetically conductive element;
- when viewed along the second axis, the second magnetic attraction force drives the second upper cover to contact the separating element.

15. The optical system as claimed in claim 14, wherein the guiding assembly further includes a first lateral sliding track formed on the fixed assembly;
- the first lateral sliding track is configured to guide the first optical element;
- the guiding assembly further includes a second lateral sliding track formed on the fixed assembly:
- the second lateral sliding track is configured to guide the second optical element;
- when the first movable part and the second movable part are located at the second preset position relative to the fixed assembly, and when viewed along the second axis, a shortest distance between the first optical element and the upper surface is different from the shortest distance between the second optical element and the upper surface.

16. The optical system as claimed in claim 15, wherein the shortest distance between the first optical element and the upper surface is greater than the shortest distance between the second optical element and the upper surface;
- when the first movable part and the second movable part are located at the second preset position relative to the fixed assembly, and when viewed along the first axis, the first optical element overlaps at least a part of the second optical element.

17. The optical system as claimed in claim 11, wherein when viewed along the first axis, the first opening is located between the second opening and the first driving assembly;
- the first optical element has a penetrating portion;
- the penetrating portion has a rectangular structure;
- when the first movable part is located at the second preset position relative to the fixed assembly, and when viewed along the first axis, the penetrating portion is located between the first opening and the second a opening;
- the supporting assembly includes a second supporting element, and the second supporting element is located between the second optical mechanism and the third optical mechanism.

* * * * *